United States Patent
Benkreira et al.

(10) Patent No.: US 10,192,159 B1
(45) Date of Patent: Jan. 29, 2019

(54) CONTACTLESS CARD WITH TRANSMISSION BLOCKING ELEMENT

(71) Applicant: Capital One Services, LLC, McLean, VA (US)

(72) Inventors: Abdelkader M'Hamed Benkreira, Washington, DC (US); Michael Mossoba, Arlington, VA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/101,360

(22) Filed: Aug. 10, 2018

(51) Int. Cl.
| | |
|---|---|
| *G06K 19/06* | (2006.01) |
| *G06K 19/077* | (2006.01) |
| *G06K 19/00* | (2006.01) |
| *G06K 7/10* | (2006.01) |
| *G06K 19/073* | (2006.01) |
| *G06K 19/07* | (2006.01) |

(52) U.S. Cl.
CPC ... *G06K 19/07749* (2013.01); *G06K 7/10198* (2013.01); *G06K 19/005* (2013.01); *G06K 19/0723* (2013.01); *G06K 19/07327* (2013.01)

(58) Field of Classification Search
CPC .. G06K 19/07; G06K 19/0723; G06K 19/073; G06K 19/07309; G06K 19/07318; G06K 19/07327; G06K 19/07747; G06K 19/07749
See application file for complete search history.

(56) References Cited

U.S. PATENT DOCUMENTS

| | | | |
|---|---|---|---|
| 7,375,631 B2 * | 5/2008 | Moskowitz | G06K 19/07327 150/147 |
| 7,950,585 B2 | 5/2011 | Skowronek et al. | |
| 9,633,239 B2 | 4/2017 | Dabrowski | |
| 10,083,387 B2 * | 9/2018 | Kurian | G06K 19/0727 |
| 2006/0283960 A1 | 12/2006 | Top | |
| 2008/0308641 A1 | 12/2008 | Finn | |
| 2010/0052912 A1 | 3/2010 | Arneson et al. | |

FOREIGN PATENT DOCUMENTS

KR 100838561 B1 6/2008

\* cited by examiner

*Primary Examiner* — Thien M Le
*Assistant Examiner* — April Taylor

(57) ABSTRACT

Approaches herein provide protection for an identification chip of a contactless device using a transmission blocking element. In some approaches, a contactless card may include a body having first and second main sides. An identification chip may be coupled to the first main side, and the transmission blocking element may be slidably coupled to the body. The identification chip is covered by the transmission blocking element in a first position, and uncovered by the transmission blocking element when the transmission blocking element is in a second position. The transmission blocking element may include a first section extending along the first main side of the body, and a second section extending parallel to the first section. The transmission blocking element may further include a tab coupling together the first and second sections, wherein the tab is positioned within an internal slot embedded within the body.

20 Claims, 12 Drawing Sheets

CONTACTLESS CARD WITH TRANSMISSION BLOCKING ELEMENT

FIELD

Embodiments of the present disclosure relate to contactless cards and, more particularly, to contactless cards with a transmission blocking element.

BACKGROUND

Generally, contactless portable consumer devices such as smart credit/debit cards, access cards, radio frequency identification devices (RFID), etc., are designed to provide the consumer with a way to engage in wireless communication using radio frequency (RF) signals. Due to the wireless nature of the contactless portable consumer devices, it is possible that a contactless reader may be used for surreptitious interrogation (e.g., data skimming) of the contactless devices. Additionally, RFID tags of contactless portable consumer devices may inadvertently communicate with a contactless reader. Although security measures may be taken by contactless card manufacturers and system administrators to prevent such security breaches, there is a need for security enhancements to contactless portable consumer devices that can be operated by the end consumer.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In at least one approach according to the disclosure, a contactless card may include a body having a first main side and a second main side, and an identification chip coupled to the first main side of the body. The contactless card may further include a transmission blocking element slidably coupled to the body. The identification chip may be covered by the transmission blocking element in a first position, and the identification chip may be uncovered when the transmission blocking element is in a second position. The transmission blocking element may include a first section extending along the first main side of the body, a second section extending parallel to the first section, and a tab coupling together the first section and the second section. The tab may be positioned within an internal slot embedded within the body between the first main side and the second main side.

In another approach according to the disclosure, a contactless identification card may include a body having a first main side and a second main side, and an identification chip coupled to the first main side of the body. The contactless card may further include a transmission blocking element slidably coupled to the body, wherein the identification chip is covered by the transmission blocking element in a first position, and wherein the identification chip is uncovered when the transmission blocking element is in a second position. The transmission blocking element may include a first section having a first planar portion extending along the first main side of the body and a first connecting portion extending into the body. The transmission blocking element may further include a second section have a second planar portion extending parallel to the first portion and a second connecting portion extending into the body towards the first connecting portion. The transmission blocking element may further include a tab coupling together the first connecting portion and the second connecting portion, wherein the tab is positioned within an internal slot embedded within the body between the first main side and the second main side.

In yet another approach according to the disclosure, a method may include providing a contactless card having a body including a first main side and a second main side and providing an identification chip coupled to the first main side of the body. The method may further include coupling a transmission blocking element to the body. The transmission blocking element may include a first section extending along the first main side of the body, a second section extending parallel to the first section, and a tab coupling together the first section and the second section. The tab may be positioned within an internal slot embedded within the body between the first main side and the second main side. The identification chip may be covered by the transmission blocking element in a first position, and the identification chip may be uncovered when the transmission blocking element is in a second position.

BRIEF DESCRIPTION OF THE DRAWINGS

The accompanying drawings illustrate example approaches of the disclosure, including the practical application of the principles thereof, as follows.

Figure 1A:
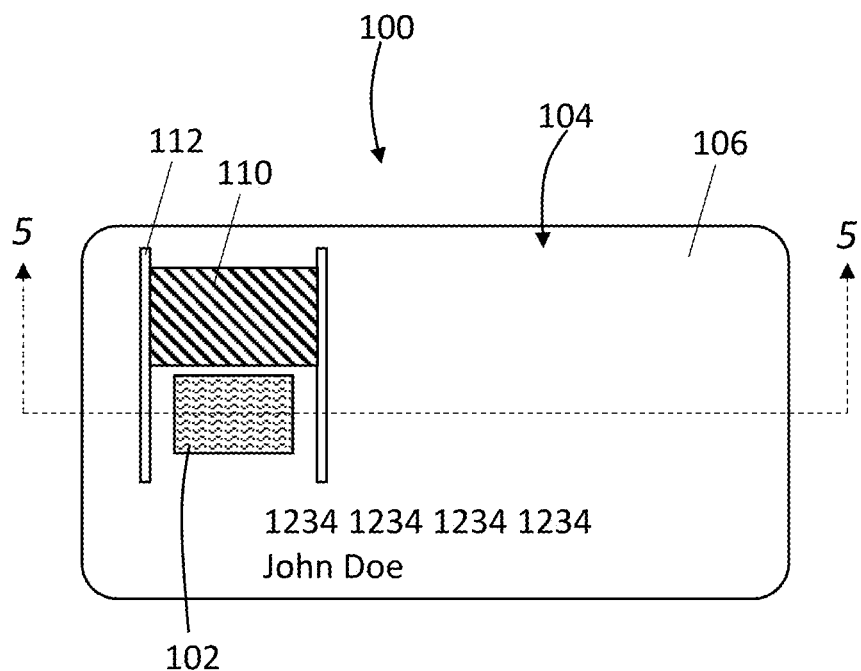
FIG. 1A is a top view illustrating a contactless card, in accordance with embodiments of the present disclosure.

The drawings are not necessarily to scale. The drawings are merely representations, not intended to portray specific parameters of the disclosure. The drawings are intended to depict example embodiments of the disclosure, and therefore are not to be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, some reference numbers may be omitted in certain drawings.

DETAILED DESCRIPTION

The present embodiments will now be described more fully hereinafter with reference to the accompanying drawings, where some embodiments are shown. The subject matter of the present disclosure may be embodied in many different forms and are not to be construed as limited to the embodiments set forth herein. These embodiments are provided so this disclosure will be thorough and complete, and will fully convey the scope of the subject matter to those skilled in the art. In the drawings, like numbers refer to like elements throughout.

Embodiments herein are directed to protected contactless cards including an identification chip, such as a RFID chip, and a transmission blocking element operably coupled to the contactless card. The transmission blocking element protects the identification chip from detection by a reader. The transmission blocking element may be moveable relative to the identification chip and the card body to expose the identification chip and permit access by the reader. In a closed position, the identification chip is at least partially covered by the transmission blocking element to disallow communication between a transponder and the identification chip.

Figure 1B:
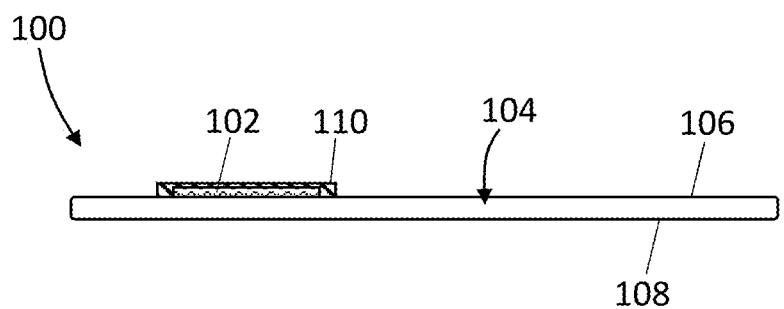
FIG. 1B is a side view of the contactless card of FIG. 1A, in accordance with embodiments of the present disclosure.

Referring now to FIGS. 1A-1B, an example contactless card (hereinafter "card") 100 according to embodiments of the disclosure will be described. The card 100 may be a contactless credit or debit card, a RFID passport, or an access card. As will be described in greater detail herein, the card 100 may include multiple layers each having one or more functions. Although non-limiting, the card 100 may be made from polyvinyl chloride (PVC), polyester or polycarbonate. Described herein as contactless due to the method of communication by an identification chip 102, such as a RFID chip, the card 100 may also provide one or more functions requiring contact. For example, the card 100 may include a conventional magnetic stripe and/or a microchip connected to contacts present on an outer layer of the card 100.

As shown, the card 100 may include a body 104 having a first main side 106 and a second main side 108 opposite the first main side 106. Although non-limiting, the first main side 106 may correspond to a front or top side of the card 100, while the second main side 108 may correspond to a back or bottom side of the card 100. The identification chip 102 may be coupled (e.g., recessed or partially embedded) to the first main side 106 of the card 100. As used herein, the identification chip 102 may be any microprocessor device configured to exchange data electromagnetically, such as a RFID chip. The RFID chip may include a radio frequency inductor, volatile or non-volatile memory storage, a microprocessor, circuitry logic, and/or an antenna. While in some embodiments electromagnetic data communications from the RFID chip will take place at radio frequencies, other embodiments may exchange electromagnetic data at different frequencies.

The card 100 may further include a transmission blocking element 110 slidably coupled to the body 104. The identification chip 102 is covered, or substantially covered, in a first position of the transmission blocking element 110, and uncovered, or substantially uncovered when the transmission blocking element 110 is in a second position. The transmission blocking element 110 shown in FIG. 1A, for example, is in the second position, thus leaving the identification chip 102 exposed and potentially available for data transmission. As will be described in greater detail below, the card 100 may further include a first set of slots 112 in the first main side 106 of the body 104. The transmission blocking element 110 is configured to extend through the first set of slots 112 and into the body 104 of the card 100.

In some embodiments, the transmission blocking element 110 may be a metal foil, a metallic link, a conductor, a metal mesh, or any combination thereof. Any type of material that creates a Faraday cage to isolate the identification chip 102 from electromagnetic radiation, such as radio frequency radiation from a RFID terminal reader, may be used. Other materials may also be used, such as plastics and polyesters.

Figure 2A:
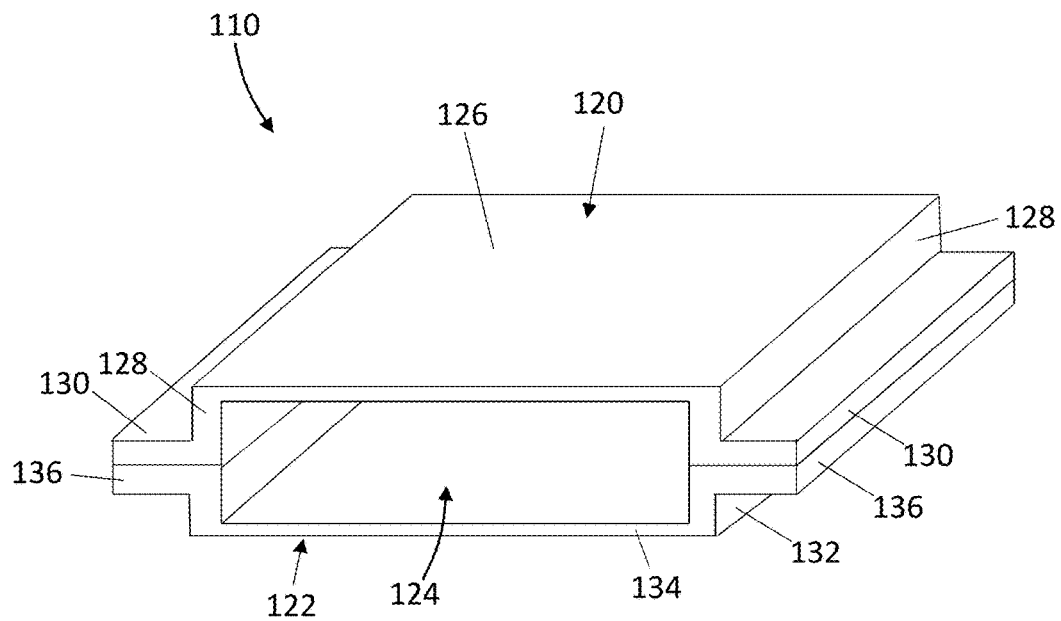
FIG. 2A is a perspective view of a transmission blocking element of the contactless card of FIGS. 1A-1B, in accordance with embodiments of the present disclosure.
Figure 2B:
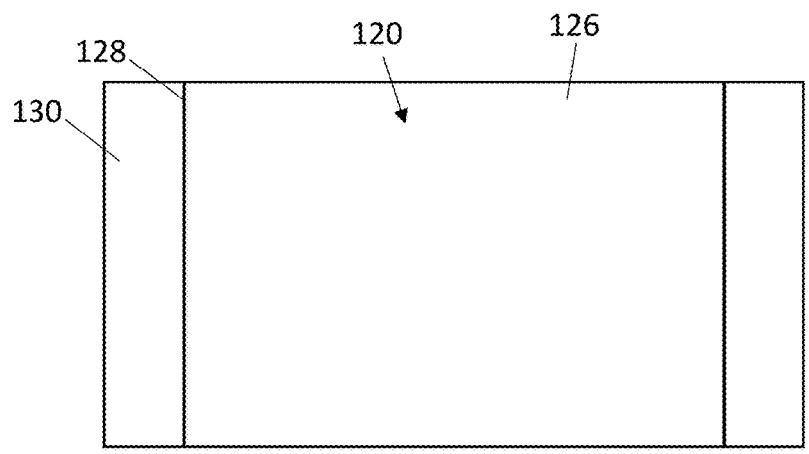
FIG. 2B is top view of the transmission blocking element of FIG. 2A, in accordance with embodiments of the present disclosure.

Turning now to FIGS. 2A-2B, the transmission blocking element 110 according to embodiments of the present disclosure will be described in greater detail. As shown, the transmission blocking element 110 may include a first section 120 in abutment with a second section 122. When joined together, the first and second sections 120, 122 define an internal cavity 124 operable to receive and partially enclose the identification chip 102 therein. As shown, the first section 120 may include a first planar portion 126 and one or more first connecting portions 128 extending from the first planar portion 126. In some embodiments, the first connecting portions 128 extend perpendicularly from the first planar portion 126 to extend into the body 104 of the card 100 through the first set of slots 112 (FIG. 1A). Extending from each of the first connection portions 128 is a first tab 130. The first tabs 130 may extend outwardly from the first connection portions 128, for example, along a plane parallel to the first planar portion 126.

The second section 122 may similarly include one or more second connecting portions 132 extending from a second planar portion 134. In some embodiments, the second connecting portions 132 extend perpendicularly from the second planar portion 134 to extend into the body 104 of the card 100, towards the first section 120. Extending from each of the second connection portions 132 is a second tab 136. The second tabs 136 may extend outwardly from the second connection portions 132, for example, along a plane parallel to the second planar portion 134. As shown, the first tabs 130 abut the second tabs 136. When assembled, the first and second tabs 130, 136 may be coupled together (e.g., by soldering or fusing) so the first and second sections 120, 122 move together in tandem. In some embodiments, the first and second tabs 130, 136 are not two independent elements and, instead, are formed as a single solid element.

Figure 3:
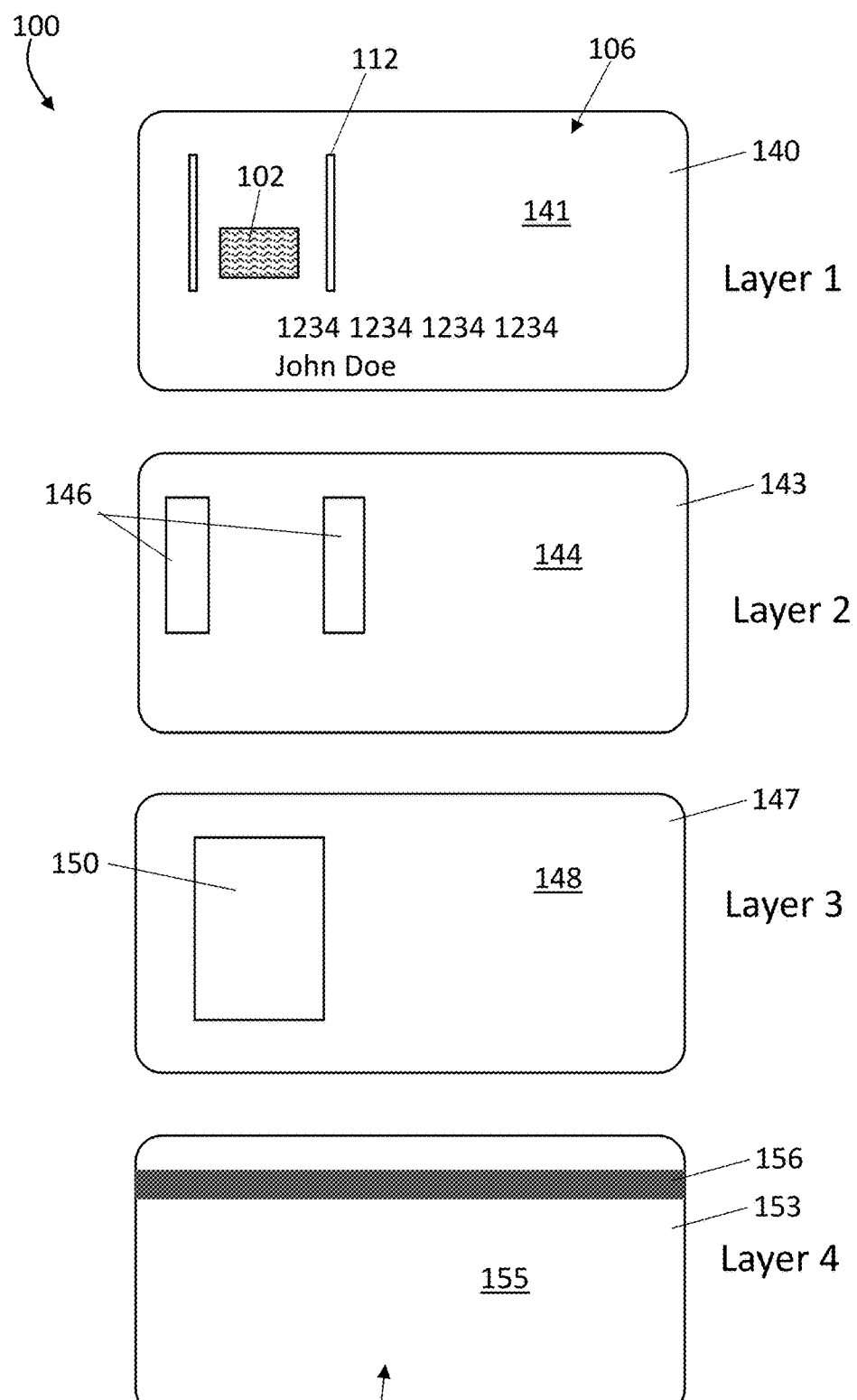
FIG. 3 is a partially exploded view of the contactless card of FIGS. 1A-1B without the transmission blocking element present, in accordance with embodiments of the present disclosure.
Figure 4:
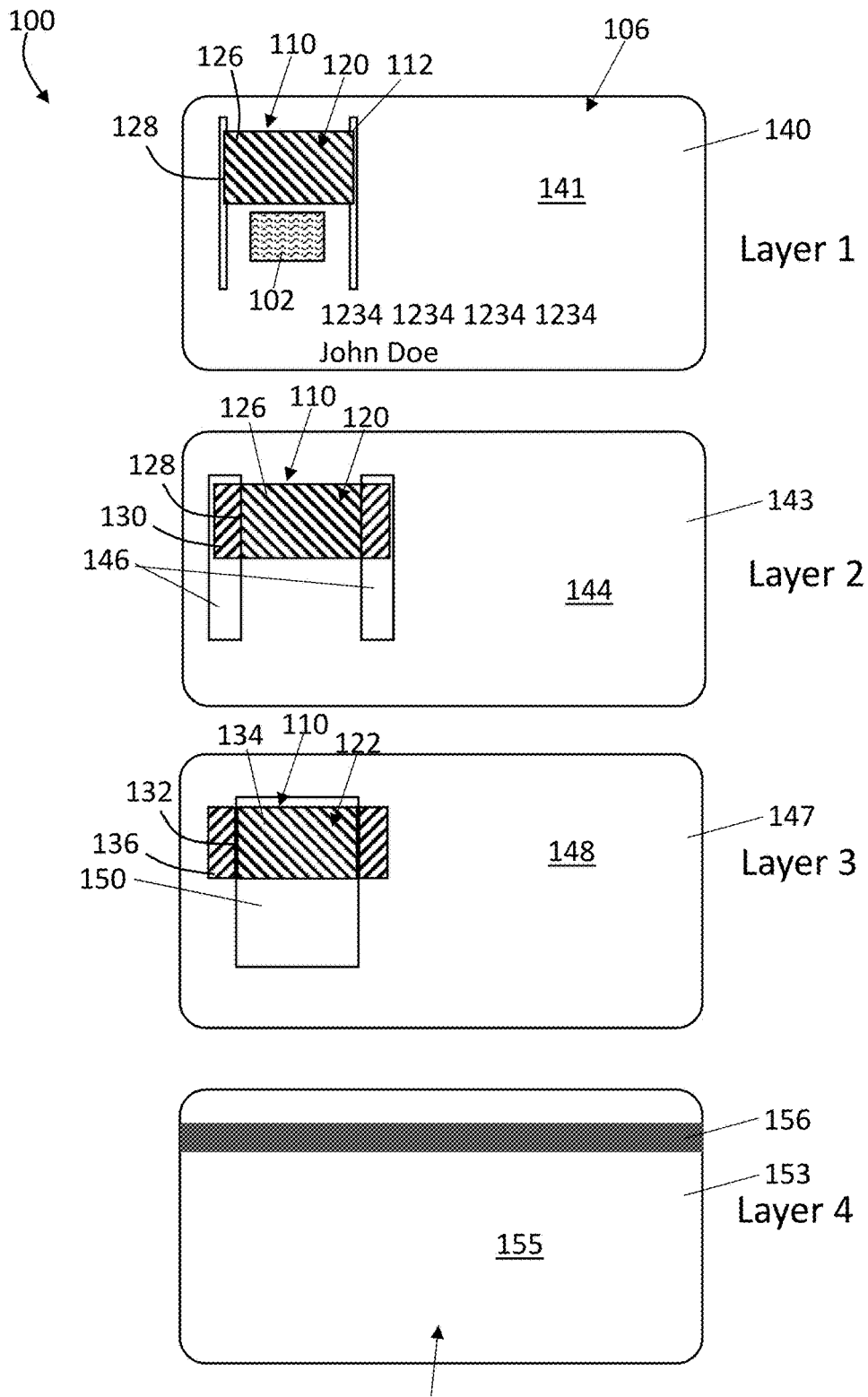
FIG. 4 is a partially exploded view of the contactless card of FIGS. 1A-1B with the transmission blocking element present, in accordance with embodiments of the present disclosure.
Figure 5:
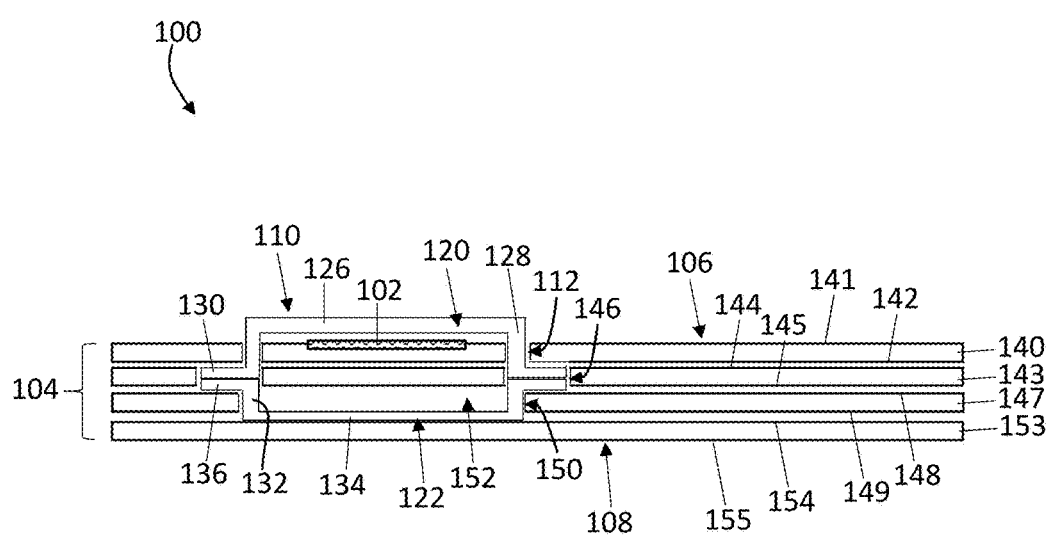
FIG. 5 is a side cross-sectional view of the contactless card along the plane 5-5 of FIG. 1A, in accordance with embodiments of the present disclosure.

Turning now to FIGS. 3-5, the card 100 according to embodiments of the present disclosure will be described in greater detail. In the non-limiting embodiment shown, the card 100 may include a plurality of layers stacked or joined together. FIG. 3 shows each layer of the card 100 without the transmission blocking element 110 present, while FIG. 4 shows each layer of the card 100 with the transmission blocking element 110 present. The card 100 may include a first layer 140 having a top surface or side 141, and a bottom surface or side 142. The top side 141 of the first layer 140 corresponds to the first main side 106 of the card 100. As shown, the first layer 140 may include the identification chip 102, as well as the first set of slots 112 formed therethrough.

The card 100 further includes a second layer 143 attached with the first layer 140. The second layer 143 may include a top surface or side 144, and a bottom surface or side 145, wherein the top side 144 is directly affixed to the bottom side 142 of the first layer 140. As shown, the second layer 143 may include one or more internal slots 146 formed therethrough. In some embodiments, the first and second tabs 130, 136 are positioned within the internal slots 146. The internal slots 146 result in proper movement of the first and second tabs 130, 136.

The card 100 may further include a third layer 147 attached with the second layer 143. The third layer 147 may include a top surface or side 148, and a bottom surface or side 149, wherein the top side 148 is directly affixed to the bottom side 145 of the second layer 143. As shown, the third layer 147 may include an opening 150 formed therethrough. When the various layers of the card 100 are assembled, the opening 150 forms an internal cavity 152 within the body 104 of the card 100. As shown in FIGS. 4-5, the second planar portion 134 and the second connecting portion 132 of the second section 122 of the transmission blocking element 110 extend through the opening 150.

The card 100 may further include a fourth layer 153 attached with the third layer 147. The fourth layer 153 may include a top surface or side 154, and a bottom surface or side 155, wherein the top side 154 is directly affixed to the bottom side 149 of the third layer 147. The bottom side 155 of the fourth layer 153 corresponds to the second main side 108 of the card 100. As shown, the fourth layer 153 covers the transmission blocking element 110 so the transmission blocking element 110 is only accessible from the first main side 106 of the card 100. In some embodiments, the fourth layer 153 may include a magnetic stripe 156 containing cardholder data in accordance with standard protocols.

Turning now to FIGS. 4-5, the transmission blocking element 110 of the card 100 according to embodiments of the present disclosure will be described in greater detail. Although shown with gaps formed therebetween for ease of viewing, it will be appreciated that each of the layers 140, 143, 147, and 153 in FIG. 5 may be directly affixed to an adjacent layer once the card 100 is assembled. As shown, the first section 120 of the transmission blocking element 110 includes the first planar portion 126 extending along the first main side 106 of the body 104. More specifically, the first planar portion 126 may extend parallel to a plane defined by the top side 141 of the first layer 140 of the card 100. The first connecting portions 128 are oriented perpendicular to the first planar portion 126 and extend through the first set of slots 112. The first tabs 130 of the first section 120 are oriented perpendicular to the first connecting portions 128 and are positioned within the internal slots 146 of the second layer 143. As shown, the first tabs 130 may extend laterally along the bottom side 142 of the first layer 140.

As further shown, the second section 122 of the transmission blocking element 110 includes the second planar portion 134 extending parallel to the first planar portion 126. The second planar portion 134 may be embedded within the body 104, beneath the identification chip 102. The second planar portion 134 may extend parallel to the top surface 154 of the fourth layer 153. The second connecting portions 132 are oriented perpendicularly to the second planar portion 134 and extend into the internal cavity 152 towards the first connecting portions 128. The second tabs 136 of the second section 122 are oriented perpendicular to the second connecting portions 132 and are positioned within the internal slots 146 of the second layer 143. As shown, the second tabs 136 may extend laterally along the top side 148 of the third layer 147. As stated above, the first and second sections 120, 122 of the element are directly physically coupled together, for example, along the first and second tabs 130, 136. To cover/uncover the identification chip 102, the transmission blocking element 110 may slide within the internal slots 146 and the internal cavity 152.

Figure 6:
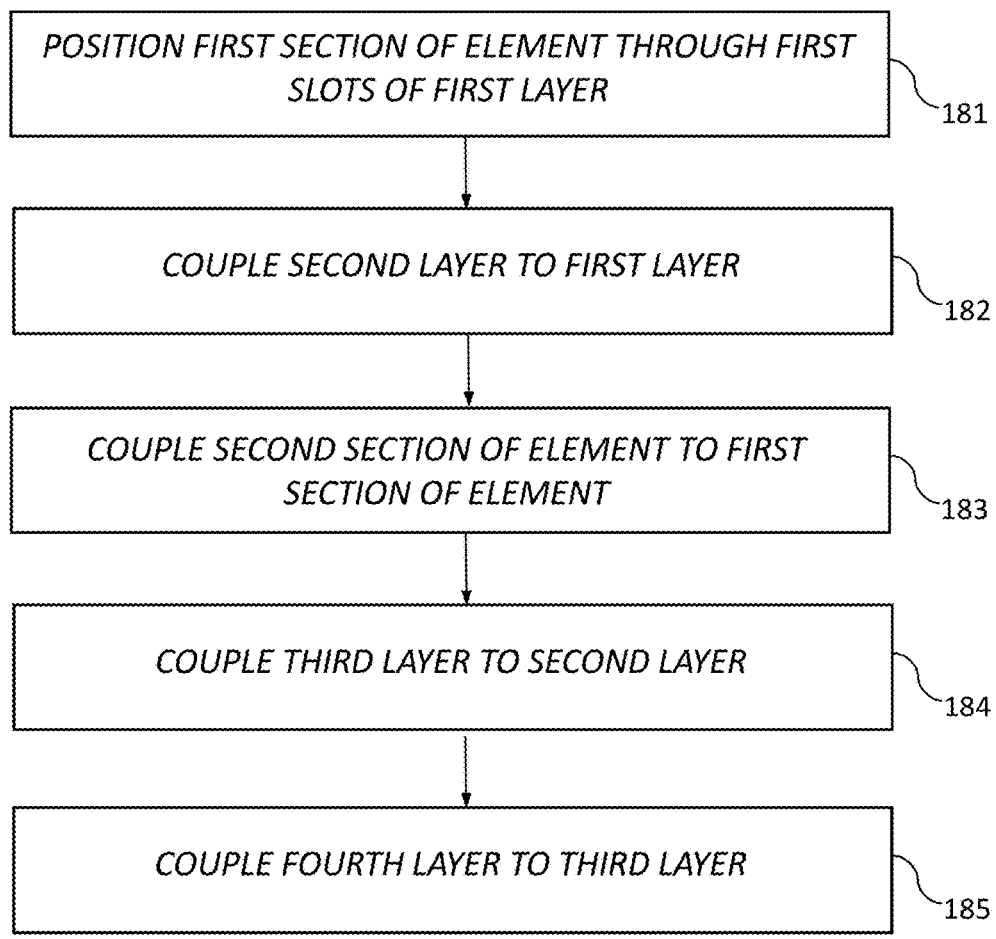
FIG. 6 illustrates an approach for assembling the contactless card of FIGS. 1A-1B, in accordance with embodiments of the present disclosure.

Turning now to FIG. 6, a method 180 of assembling the card 100 according to non-limiting embodiments of the present disclosure will be described. The method 180 will be described in conjunction with the representations shown in FIGS. 1A-5. At block 181, the method 180 may include positioning the first section 120 of the transmission blocking element 110 through the first set of slots 112 of the first layer 140. At block 182, the second layer 143 may be coupled to the first layer 140. In some embodiments, the first set of slots 112 of the first layer 140 are aligned with the internal slots 146 so the first tabs 130 of the first section 120 are positioned within the internal slots 146. At block 183, the second section 122 of the transmission blocking element 110 may be coupled to the first section 120. For example, the second tabs 136 may be soldered or otherwise fixed to the first tabs 130. At block 184, the third layer 147 may be coupled to the second layer 143. The second planar portion 134 of the second section 122 of the transmission blocking element 110 may extend through the opening 150 of the third layer 147. At block 185, the fourth layer 153 may be coupled to the third layer 147.

Figure 7A:
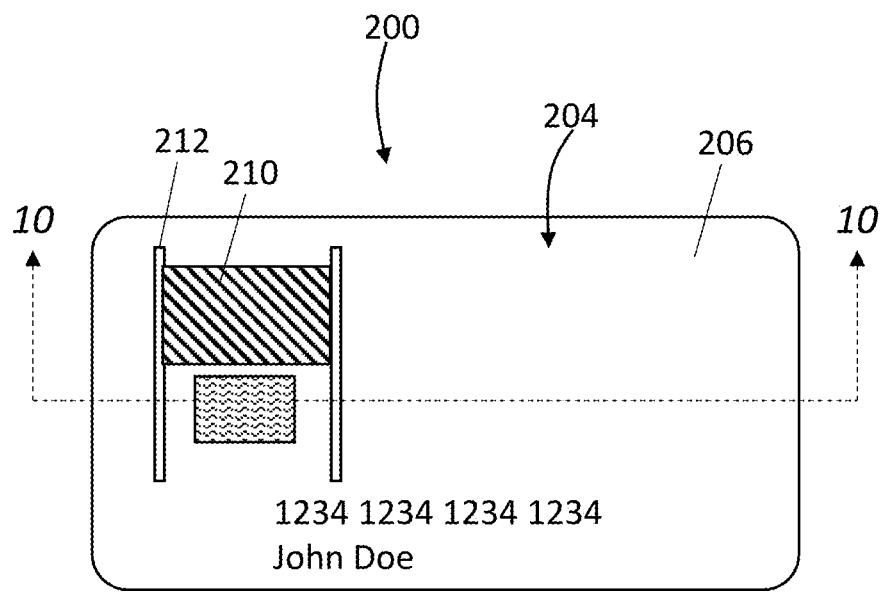
FIG. 7A is a top view illustrating a contactless card, in accordance with embodiments of the present disclosure.
Figure 7B:
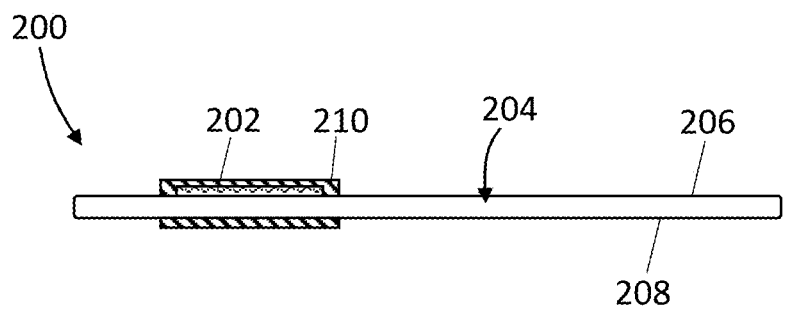
FIG. 7B is a side view of the contactless card of FIG. 7A, in accordance with embodiments of the present disclosure.

Turning now to FIGS. 7A-7B, an example contactless card (hereinafter "card") 200 according to embodiments of the disclosure will be described. The card 200 may share many of the same features as the card 100 described above. As such, some features of the card 200 will not be discussed in detail for the sake of brevity. As shown, the card 200 may include a body 204 having a first main side 206 and a second main side 208 opposite the first main side 206. Although non-limiting, the first main side 206 may correspond to a front or top side of the card 200, while the second main side 208 may correspond to a back or bottom side of the card 200. The identification chip 202 may be coupled to, or embedded into, the first main side 206 of the card 200.

The card 200 may further include a transmission blocking element 210 slidably coupled to the body 204. The identification chip 202 is covered, or substantially covered, in a first position of the transmission blocking element 210, and uncovered, or substantially uncovered when the transmission blocking element 210 is in a second position. The transmission blocking element 210 shown in FIG. 7A, for example, is in the second position, thus leaving the identification chip 202 exposed and potentially available for data transmission. As will be described in greater detail below, the card 200 may further include a first set of slots 212 in the first main side 206 of the body 204, and a second set of slots 260 in the second main side 208 of the body. The transmission blocking element 210 is configured to extend through the first set of slots 212 and the second set of slots 260, and into the body 204 of the card 200.

Figure 8:
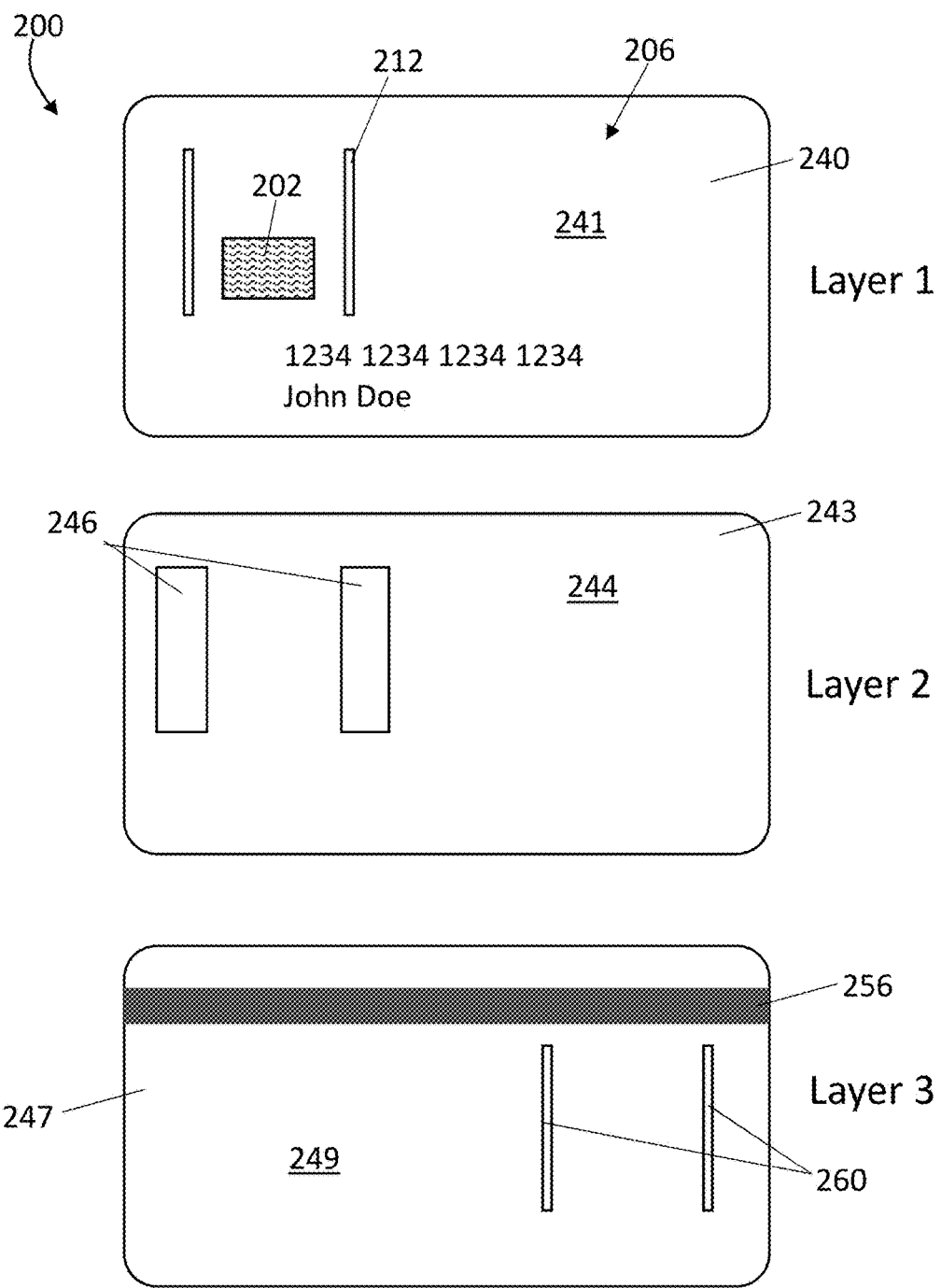
FIG. 8 is a partially exploded view of the contactless card of FIGS. 7A-7B without the transmission blocking element present, in accordance with embodiments of the present disclosure.
Figure 9:
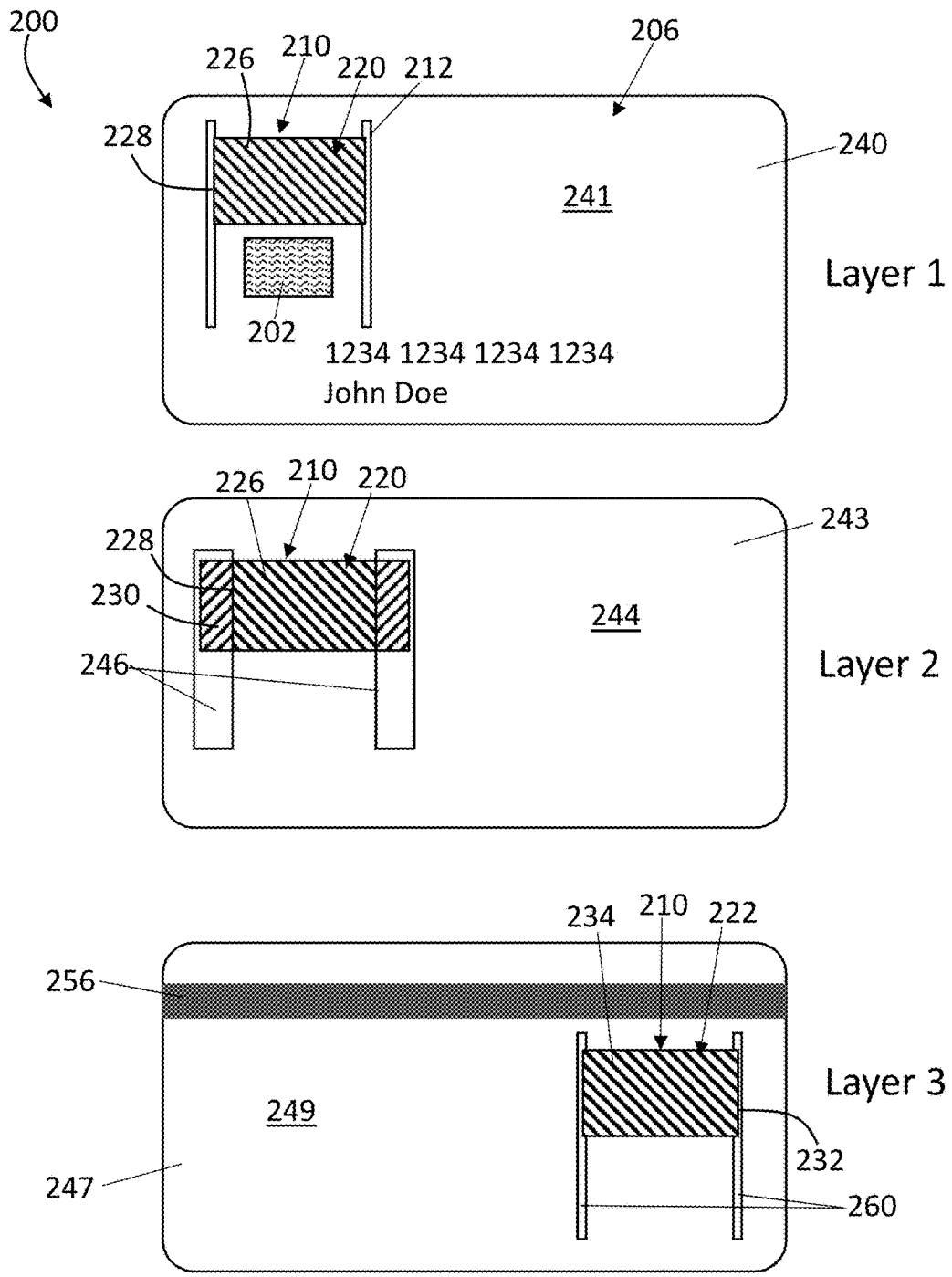
FIG. 9 is a partially exploded view of the contactless card of FIGS. 7A-7B with the transmission blocking element present, in accordance with embodiments of the present disclosure.
Figure 10:
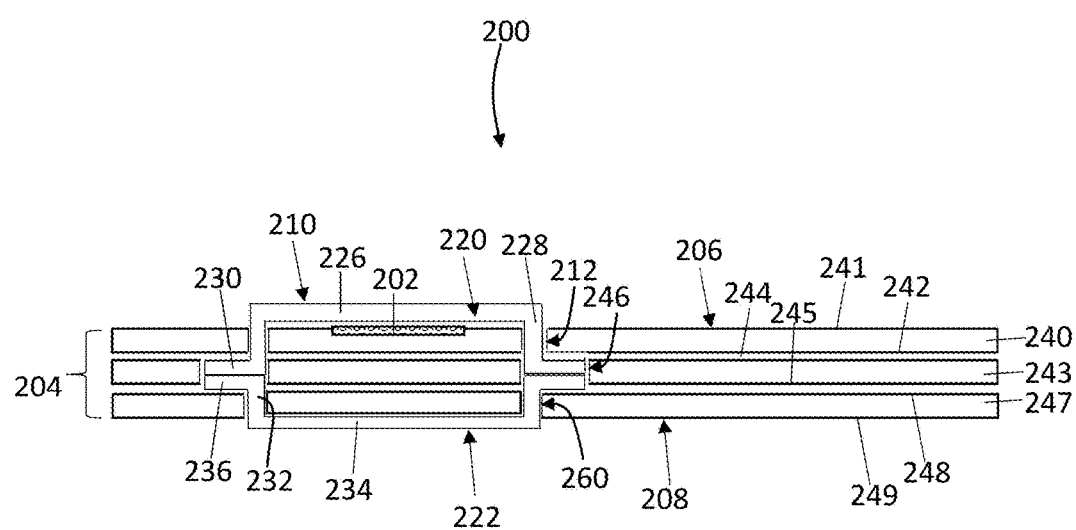
FIG. 10 is a side cross-sectional view of the contactless card along the plane 10-10 of FIG. 7A, in accordance with embodiments of the present disclosure.

Turning now to FIGS. 8-10, the card 200 according to embodiments of the present disclosure will be described in greater detail. FIG. 8 shows each layer of the card 200 without the transmission blocking element 210 present, while FIG. 9 shows each layer of the card 200 with the transmission blocking element 210 present. The card 200 may include a first layer 240 having a top surface or side 241, and a bottom surface or side 242. The top side 241 of the first layer 240 corresponds to the first main side 206 of the card 200. As shown, the first layer 240 may include the identification chip 202, as well as the first set of slots 212.

The card 200 further includes a second layer 243 attached with the first layer 240. The second layer 243 may include a top surface or side 244, and a bottom surface or side 245, wherein the top side 244 is directly affixed to the bottom side 242 of the first layer 240. As shown, the second layer 243 may include one or more internal slots 246 formed therethrough. In some embodiments, the first and second tabs 230, 236 of the transmission blocking element 210 are positioned within the internal slots 246.

The card 200 may further include a third layer 247 attached with the second layer 243. The third layer 247 may include a top surface or side 248, and a bottom surface or side 249, wherein the top side 248 is directly affixed to the bottom side 245 of the second layer 243. As shown, the third layer 247 may include the second set of slots 260. The second connecting portions 232 of the second section 222 of the transmission blocking element 210 may extend through the second set of slots 260. The second tabs 236 of the second section 222 engage the first tabs 230 of the first section 220 to form the transmission blocking element 210. As shown, the second section 222 of the transmission blocking element 210 extends along the second main side 208 of the body 204. In some embodiments, the second section 222 of the transmission blocking element 210 is accessible from the second main side 208 of the card 200. In some embodiments, the third layer 247 may include a magnetic stripe 256 containing cardholder data in accordance with standard protocols.

Turning now to FIGS. 9-10, the transmission blocking element 210 of the card 100 according to embodiments of the present disclosure will be described in greater detail. Although shown with gaps formed therebetween for ease of viewing, it will be appreciated that each of the layers 240, 243, and 247 in FIG. 10 may be directly affixed to an adjacent layer once the card 200 is assembled. As shown, the first section 220 of the transmission blocking element 210 includes the first planar portion 226 extending along the first main side 206 of the body 204. More specifically, the first planar portion 226 may extend parallel to a plane defined by the top side 241 of the first layer 240 of the card 200. The first connecting portions 228 are oriented perpendicular to the first planar portion 226 and extend through the first set of slots 212 of the first layer 240. The first tabs 230 of the first section 220 are oriented perpendicular to the first connecting portions 228 and are positioned within the internal slots 246 of the second layer 243. As shown, the first tabs 230 may extend laterally along the bottom side 242 of the first layer 240.

As further shown, the second section 222 of the transmission blocking element 210 includes the second planar portion 234 extending parallel to the first planar portion 226. The second planar portion 234 may be positioned external to the third layer 247 of the body 204, beneath the identification chip 102. Stated differently, the second planar portion 234 may extend parallel to the bottom surface 249 of the third layer 247. The second connecting portions 232 are oriented perpendicular to the second planar portion 234 and extend into the body 204 towards the first connecting portions 228. The second tabs 236 of the second section 222 are oriented perpendicular to the second connecting portions 232 and are positioned within the internal slots 246 of the second layer 243. As shown, the second tabs 236 may extend laterally along the top side 248 of the third layer 247. As stated above, the first and second sections 220, 222 of the element are directly physically coupled together, for example, along the first tabs 230 and the second tabs 236. To cover/uncover the identification chip 202, the transmission blocking element 210 may slide within the internal slots 246.

Figure 11:
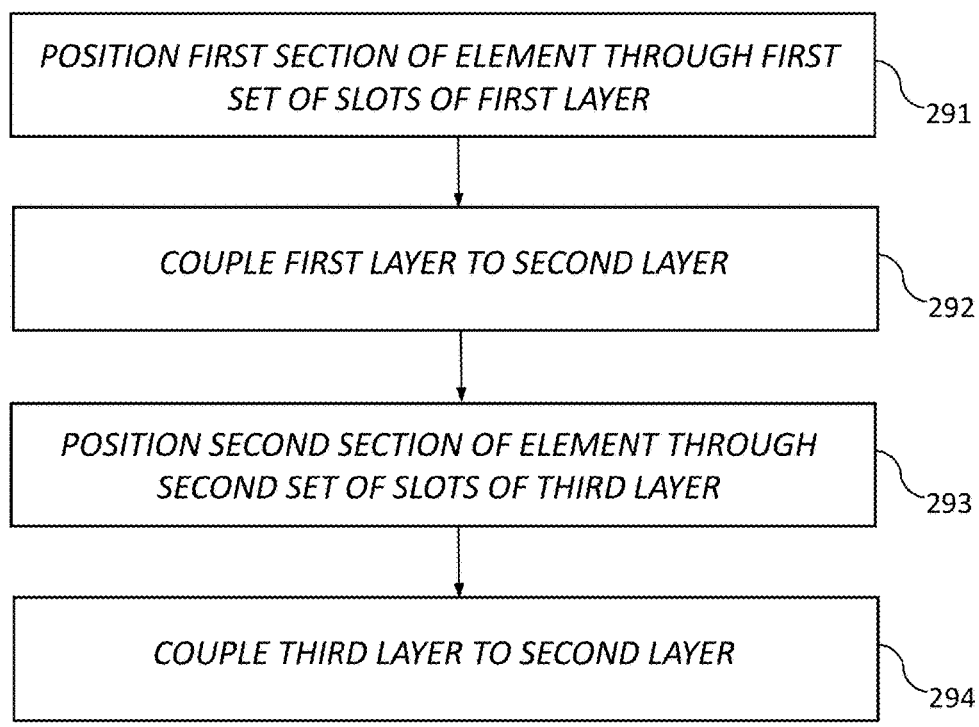
FIG. 11 illustrates an approach for assembling the contactless card of FIGS. 7A-7B, in accordance with embodiments of the present disclosure.

Turning now to FIG. 11, a method 290 of assembling the card 200 according to non-limiting embodiments of the present disclosure will be described. The method 290 will be described in conjunction with the representations shown in FIGS. 7A-10. At block 291, the method 290 may include positioning the first section 220 of the transmission blocking element 210 through the first set of slots 212 of the first layer 240. At block 292, the second layer 243 may be coupled to the first layer 240. In some embodiments, the first set of slots 212 of the first layer 240 are aligned with the internal slots 246 of the second layer 243 so the first tabs 230 of the first section 220 are positioned within the internal slots 246. At block 293, the second section 222 of the transmission blocking element 210 may be positioned through the second set of slots 260 of the third layer 247. At block 294, the third layer 247 may be affixed to the second layer 243. In some embodiments, the second set of slots 260 of the third layer 247 are aligned with the internal slots 246 of the second layer 243 so the second tabs 236 of the second section 222 are positioned within the internal slots 246. The first and second tabs 230, 236 may be joined together.

Figure 12:
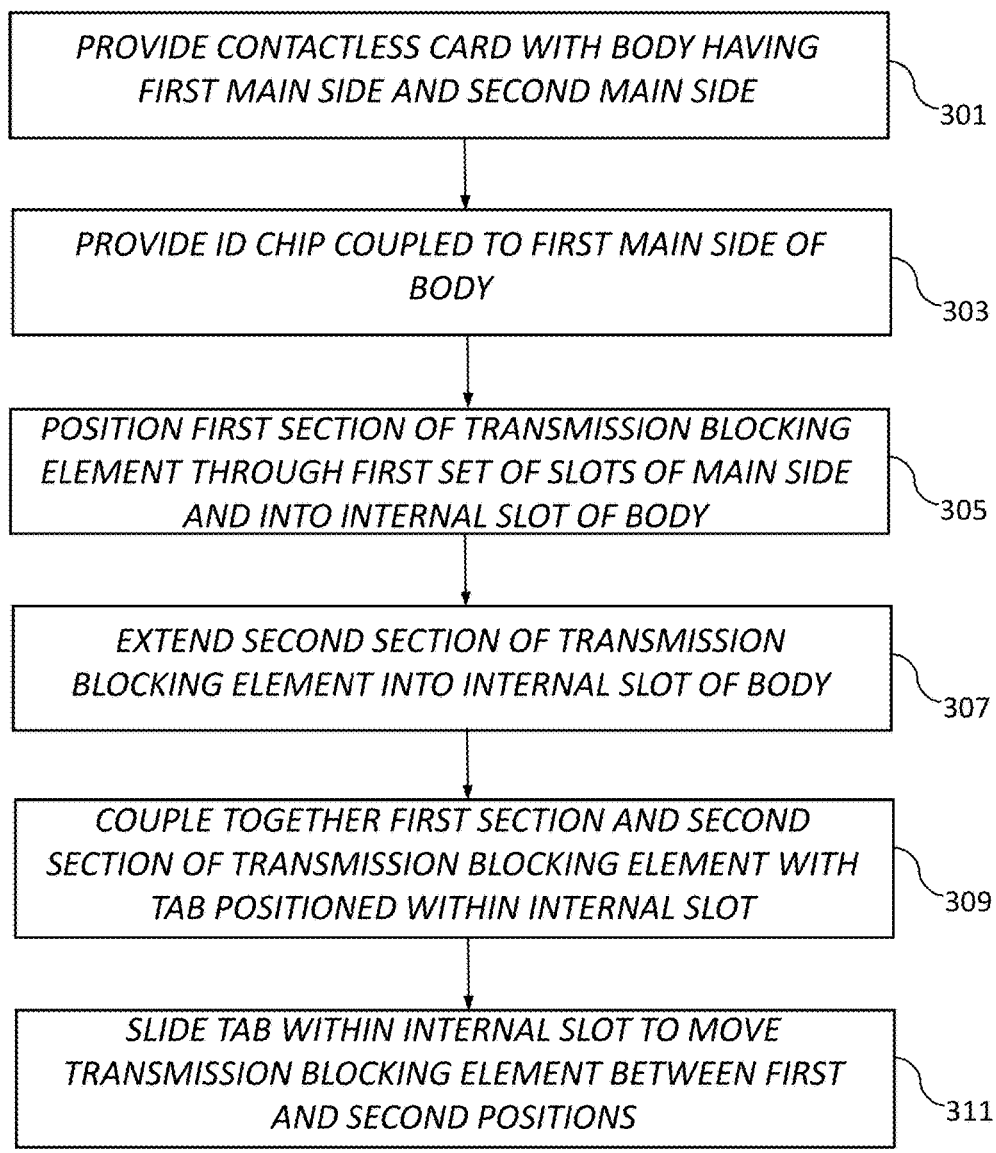
FIG. 12 illustrates a flowchart for performing methods in accordance with embodiments of the present disclosure.

Turning now to FIG. 12, a method 300 for protecting contactless cards according to embodiments of the disclosure will be described in greater detail. At block 301, the method 300 may include providing a contactless card having a body including a first main side and a second main side. In some embodiments, the contactless card may be a credit or debit card, a RFID passport, or an access card. The contactless card may include multiple layers each having one or more functions.

At block 303, the method 300 may include providing an identification chip coupled to the first main side of the body. In some embodiments, the identification chip may be any microprocessor device configured to exchange data electromagnetically, such as a RFID chip. The identification chip may include a radio frequency inductor, volatile or non-volatile memory storage, a microprocessor, circuitry logic, and/or an antenna.

At block 305, the method 300 may include positioning a first section of a transmission blocking element through a first set of slots of the first main side of the body and into an internal slot of the body to couple the transmission blocking element to the body. In some embodiments, the first section extends along the first main side of the body. In some embodiments, the first section includes a first planar portion extending along the first main side of the body, and a first connecting portion extending into the body. In some embodiments, the transmission blocking element may be a metal foil, a metallic link, a conductor, a metal mesh, or any combination thereof.

At block 307, the method 300 may include extending a second section of the transmission blocking element into the internal slot of the body of the card, between the first main side and the second main side. In some embodiments, the second section of the transmission blocking element extends into an internal cavity embedded within the body between the first main side and the second main side. In some embodiments, the second section includes a second planar portion, and a second connecting portion extending into the body towards the first connecting portion of the first section.

At block 309, the method 300 may include a coupling together the first section and the second section with a tab positioned within the internal slot embedded within the body between the first main side and the second main side. In some embodiments, one or more tabs of the first section are joined together with one or more tabs of the second section. In some embodiments, the tabs of the first and second sections are fixed (e.g., soldered) together so that the first and second sections move simultaneously.

At block 311, the method 300 may include sliding the tab within the internal slot to move the transmission blocking element between the first position and the second position. In some embodiments, the second section of the transmission blocking element simultaneously slides within the internal cavity. In the second position, the transmission blocking element envelopes the identification chip to substantially prevent transmission of data from the identification chip. In the first position, the transmission blocking element exposes the identification chip to allow transmission of data from the identification chip.

In summation, embodiments described herein advantageously provide a transmission blocking element to protect the identification chip from detection by a reader. The transmission blocking element may be moveable relative to the identification chip and the card body to expose the identification chip and permit access by the reader. In a closed position, the identification chip is substantially covered by the transmission blocking element so as to disallow communication between a transponder and the identification chip. In the case a cardholder has multiple cards in his/her possession, the cardholder will have a simple way to delineate which card can be accessed and thus charged by a reader.

Furthermore, the transmission blocking element of the embodiments herein advantageously provides enhanced signal blocking. For example, when the first and second sections of the transmission blocking element are joined together, and the transmission blocking element is positioned around the identification chip, the first planar portion and the second planar portion are positioned on opposite sides of the identification chip. As a result, signal transmission through the first and second main sides of the card is eliminated or greatly reduced. Furthermore, in the case the second section is embedded within the body of the card, the transmission blocking element more effectively prevents RF transmission from the identification chip due to the close proximity of the second planar portion to the identification chip. Still furthermore, the first connecting portions of the first section and the second connecting portions of the second section join together to encapsulate the identification chip, thus further reducing signal transmission. The more exhaustive signal blocking provided by the structure of the identification chip becomes more advantageous as contactless card technology evolves, and as the signal strength in the identification chips becomes more powerful.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary. Although non-limiting, the card 100 and the card 200 described herein may have standardized dimensions. For example, ISO/IEC 7816 is an international standard related to electronic identification cards with contacts, especially smart cards, managed jointly by the International Organization for Standardization (ISO) and the International Electrotechnical Commission (IEC). There are other standards, however, such as ISO/IEC 14443 for contactless cards (PayPass, PayWave, ExpressPay). A further standard ISO/IEC 7810 ID-1, with which most credit cards are compliant, defines dimensions as 85.60×53.98 mm (3.370×2.125 in) and a thickness of 0.76 mm (0.030 in).

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

Still furthermore, although the illustrative methods 180, 290, and 300 are described above as a series of acts or events, the present disclosure is not limited by the illustrated ordering of such acts or events unless specifically stated. For example, some acts may occur in different orders and/or concurrently with other acts or events apart from those illustrated and/or described herein, in accordance with the disclosure. In addition, not all illustrated acts or events may be required to implement a methodology in accordance with the present disclosure. Furthermore, the methods 180, 290, and 300 may be implemented in association with the formation and/or processing of structures illustrated and described herein as well as in association with other structures not illustrated.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A contactless card comprising:
   a body having a first main side and a second main side;
   an identification chip coupled to the first main side of the body; and
   a transmission blocking element slidably coupled to the body, wherein the identification chip is covered by the transmission blocking element in a first position, wherein the identification chip is uncovered when the transmission blocking element is in a second position, and wherein the transmission blocking element comprises:
   a first section extending along the first main side of the body;
   a second section extending parallel to the first section; and
   a tab coupling together the first section and the second section, wherein the tab is positioned within an internal slot embedded within the body between the first main side and the second main side.

2. The contactless card of claim 1, further comprising a first set of slots in the first main side of the body, wherein the transmission blocking element extends through the first set of slots.

3. The contactless card of claim 2, wherein the first section of the transmission blocking element extends through the first set of slots in the first main side of the body.

4. The contactless card of claim 2, further comprising an internal cavity, wherein the second section of the transmission blocking element extends into the internal cavity.

5. The contactless card of claim 4, the body comprising:
   a first layer, wherein the first set of slots is provided through the first layer;
   a second layer directly attached to the first layer, wherein the internal slot is provided through the second layer;
   a third layer directly attached to the second layer, wherein the internal cavity is an opening provided through the third layer; and
   a fourth layer directly attached to the third layer.

6. The contactless card of claim 1, further comprising a second set of slots in the second main side of the body, wherein the transmission blocking element extends through the second set of slots.

7. The contactless card of claim 6, wherein the second section of the transmission blocking element extends through the second set of slots in the second main side of the body, and wherein the second section of the transmission blocking element extends along the second main side of the body.

8. The contactless card of claim 6, the body comprising:
   a first layer, wherein a first set of slots is provided through the first layer;
   a second layer directly attached to the first layer, wherein the internal slot is provided through the second layer; and
   a third layer directly attached to the second layer, wherein the second set of slots is provided through the third layer.

9. The contactless card of claim 1, wherein the identification chip is a radio frequency identification chip, and wherein the transmission blocking element is metallic.

10. A contactless identification card comprising:
    a body having a first main side and a second main side;
    an identification chip coupled to the first main side of the body; and
    a transmission blocking element slidably coupled to the body, wherein the identification chip is covered by the transmission blocking element in a first position, wherein the identification chip is uncovered when the transmission blocking element is in a second position, and wherein the transmission blocking element comprises:
    a first section having a first planar portion extending along the first main side of the body and a first connecting portion extending into the body;
    a second section have a second planar portion extending parallel to the first planar portion and a second connecting portion extending into the body towards the first connecting portion; and
    a tab coupling together the first connecting portion and the second connecting portion, wherein the tab is positioned within an internal slot embedded within the body between the first main side and the second main side.

11. The contactless identification card of claim 10, further comprising a first set of slots in the first main side of the body, wherein the transmission blocking element extends through the first set of slots.

12. The contactless identification card of claim 11, wherein the first connecting portion of the first section of the transmission blocking element extends through the first set of slots in the first main side of the body.

13. The contactless identification card of claim 11, further comprising an internal cavity, wherein the second planar portion of the second section of the transmission blocking element extends into the internal cavity.

14. The contactless identification card of claim 13, the body comprising:
    a first layer, wherein the first set of slots is provided through the first layer;

a second layer directly attached to the first layer, wherein the internal slot is provided through the second layer;

a third layer directly attached to the second layer, wherein the internal cavity is an opening provided through the third layer; and a fourth layer directly attached to the third layer.

15. The contactless identification card of claim 10, wherein the second connecting portion of the second section of the transmission blocking element extends through a second set of slots provided in the second main side of the body, and wherein the second planar portion of the second section of the transmission blocking element extends along an exterior surface of the second main side of the body.

16. The contactless identification card of claim 15, the body comprising:

a first layer, wherein a first set of slots is provided through the first layer;

a second layer directly attached to the first layer, wherein the internal slot is provided through the second layer; and a third layer directly attached to the second layer, wherein the second set of slots is provided through the third layer.

17. A method comprising:

providing a contactless card having a body including a first main side and a second main side;

providing an identification chip coupled to the first main side of the body;

coupling a transmission blocking element to the body, wherein the transmission blocking element comprises:

a first section extending along the first main side of the body;

a second section extending parallel to the first section; and a tab coupling together the first section and the second section, wherein the tab is positioned within an internal slot embedded within the body between the first main side and the second main side, wherein the identification chip is covered by the transmission blocking element in a first position, and wherein the identification chip is uncovered when the transmission blocking element is in a second position.

18. The method of claim 17, further comprising:

providing a first set of slots in the first main side of the body; and extending the transmission blocking element through the first set of slots.

19. The method of claim 17, further comprising extending the second section of the transmission blocking element into an internal cavity, the internal cavity embedded within the body between the first main side and the second main side.

20. The method of claim 19, further comprising sliding the tab within the internal slot and sliding the second section of the transmission blocking element within the internal cavity to move the transmission blocking element between the first position and the second position, wherein in the second position the transmission blocking element substantially prevents transmission of data from the identification chip.

* * * * *